DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 7, 1972

904 O.G. 6

T904,004

RUMINANT DIRECT FEEDING SUSPENSION SUPPLEMENT

Frank P. Achorn, 2315 Sherrod Ave., and Frank Anderson, Jr., 517 W. Lelia St., both of Florence, Ala. 35630

Filed Oct. 22, 1971, Ser. No. 191,853

Int. Cl. A23k *1/22, 1/175*

U.S. Cl. 99—2 ND

No Drawing. 26 Pages Specification

A direct molasses-containing feeding supplement designed to cure or prevent in ruminants low blood serum magnesium and/or calcium levels, which low levels lead to the ailment, grass tetany. In order to incorporate sufficient magnesium as an oxide to do the job, the solubility limit is exceeded in the aqueous system resulting in a suspension supplement. Previously, such suspensions would gel in short order and become useless. It has now been discovered that gelling can be prevented for substantial periods of time if the ammonium polyphosphate solution component of the suspension contains greater than about 70 percent polyphosphate species therein expressed as $P_2O_5$ including substantial amounts of tripoly.

Perhaps the most significant feature of our invention is to suspend with the use of clay the maximum amount of magnesium oxide (as well as calcium oxides or calcium carbonates and/or sulfur as elemental sulfur or ammonium sulfate) in our direct feeding supplement suspension. Inasmuch as the maximum permissible daily uptake by the individual ruminant of the feed supplement is determined to a great extent by the toxicity level of the nonprotein nitrogen therein (i.e., that supplied by the ammonia utilized in ammoniating said phosphoric acid), it is of utmost importance that such amounts of supplement carry to the ruminant at least the minimum daily requirement of Mg.